United States Patent [19]

Cane

[11] Patent Number: 5,046,984

[45] Date of Patent: Sep. 10, 1991

[54] BOUNCING BALL LAUNCHER

[76] Inventor: David A. Cane, 4 Deacon La., Sudbury, Mass. 01778

[21] Appl. No.: 507,998

[22] Filed: Apr. 11, 1990

[51] Int. Cl.[5] .................... A63H 29/08; A63H 33/00; A63H 29/00; G09B 23/08

[52] U.S. Cl. .................................. 446/168; 446/429; 446/489; 446/311; 434/302; 273/323; 124/16

[58] Field of Search .................... 446/168, 69, 4, 5, 3, 446/117, 140, 166, 167, 169, 170, 173, 174, 228, 429, 430, 435, 489, 308, 309, 310, 311, 312, 399; 434/283, 300, 302; 273/323, 324, 328, 428; 124/16, 17

[56] References Cited

U.S. PATENT DOCUMENTS

D. 217,912 6/1970 Trippett .......................... 434/302 X
3,101,946 8/1963 Ebert .............................. 446/170 X
3,262,440 7/1966 Kuhn .................................... 124/67
3,289,321 12/1966 Sussman ............................ 434/300
3,533,625 10/1970 Kossor et al. .................. 446/168 X
3,594,925 7/1971 Abbat ................................ 434/302
3,777,412 12/1973 Lawlor et al. ...................... 434/302
3,883,137 5/1975 Bengtson ........................ 446/168 X
4,394,016 7/1983 Manos ............................ 446/168 X

FOREIGN PATENT DOCUMENTS 564650 8/1977 U.S.S.R. ............................ 434/302

*Primary Examiner*—Robert A. Hafer
*Assistant Examiner*—D. Neal Muir
*Attorney, Agent, or Firm*—Lahive & Cockfield

[57] ABSTRACT

An improved amusement device includes a base and open-top guide tube with two or more balls in the tube. When the balls are lifted to the top of the guide tube and dropped, the top ball rebounds to a height much higher than that from which it was dropped. With three balls in the tube, for example, the top one will typically rebound to a height six times as high as the height from which it was dropped.

20 Claims, 5 Drawing Sheets

BOUNCING BALL LAUNCHER

BACKGROUND

This invention relates to amusement devices and, more particularly, to devices that exploit the laws of physics for purposes of amusement.

An object of this invention is to provide an improved amusement device.

More particularly, an object of the invention is invention is to provide a device that exploits the laws of physics for amusement.

Another object of the invention is to provide an amusement device for both adult and child alike.

Still another object of the invention is to provide an amusement device of simple construction which can be fabricated for relatively low cost.

SUMMARY OF THE INVENTION

The aforementioned and other objects are met by the invention which provides, in one aspect, an amusement device including a base and open-top guide tube with two or more balls in the tube. When the balls are lifted to the top of the guide tube and dropped, the toy produces the startling and amusing result that the top ball rebounds to a height much higher than it was dropped from. With three balls in the tube, the top one will typically rebound to a height six times as high as it was dropped from.

Alternative aspects of the invention permit the playing of games. In one such aspect, a movable deflector mounted above the tube allows the top ball to be aimed at a target as it is rebounding. In another such aspect, a funnel cone added to the top of the tube allows one to attempt to catch the top ball as it falls back after rebounding.

These and other aspects of the invention are evident in the accompanying drawings, and in the description which follows.

BRIEF DESCRIPTION OF THE DRAWINGS

A more complete understanding of the invention may be obtained by reference to the drawings in which.

DETAILED DESCRIPTION OF THE ILLUSTRATED EMBODIMENT

Figure 1:
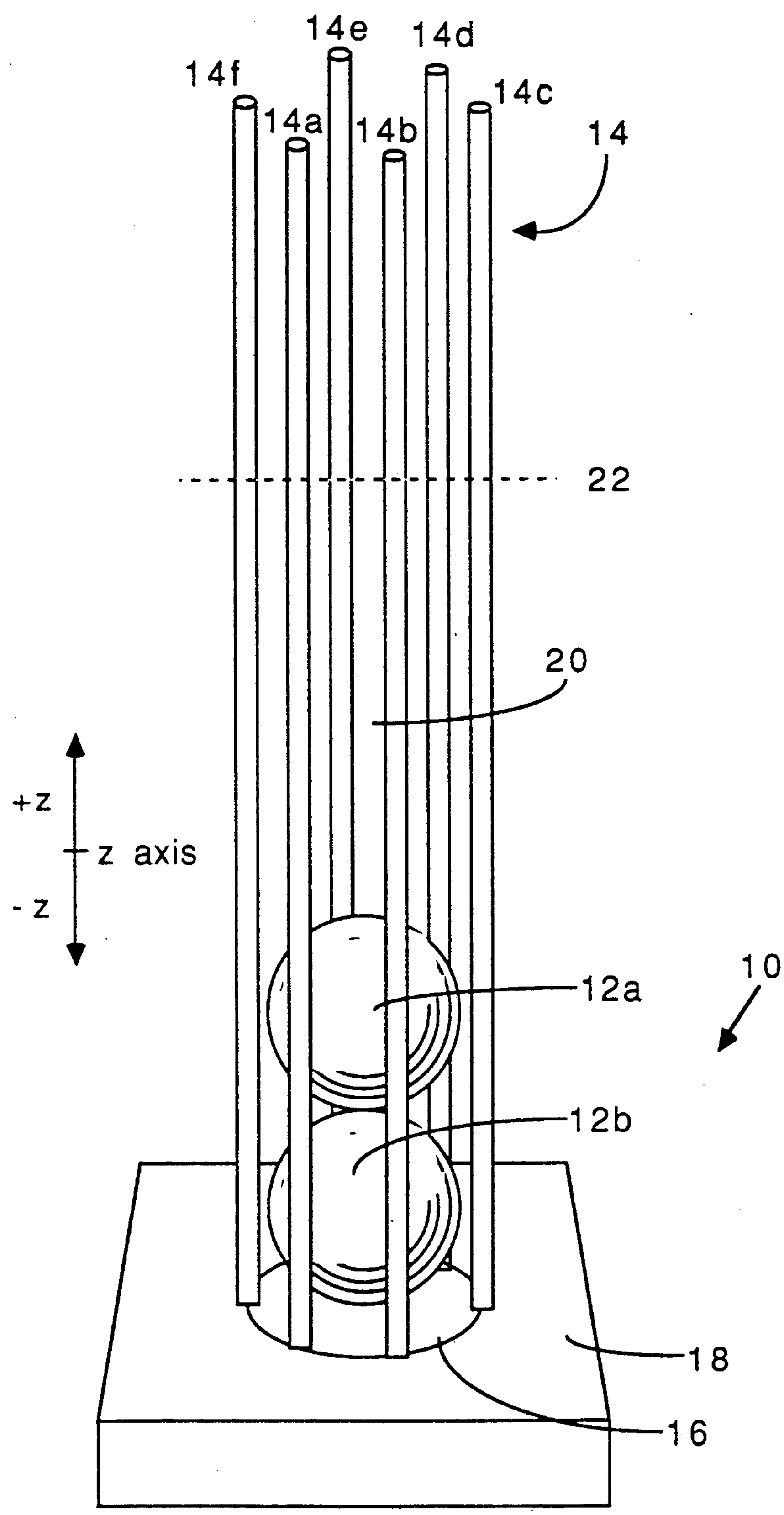
FIG. 1 depicts an amusement device constructed in accord with one preferred aspect of the invention and arranged to operate under a gravitational force field.

FIG. 1 depicts an amusement device 10 constructed in accord with one preferred aspect of the invention and arranged to operate under a gravitational force field (not shown) that accelerates masses downwardly along the −z axis. The illustrated device 10 includes a plurality of bounce elements 12*a*, 12*b* which, preferably, are balls.

A guide 14 constrains the balls 12*a*, 12*b* so that they move substantially in a line parallel to the direction of the force field, e.g., along the z-axis. As particularly shown in FIG. 1, a preferred guide 14 comprises six rods 14*a*–14*f* positioned to define a tube having a circular cross-section, as indicated by dashed line 16. Preferably, the rods 14*a*–14*f* are evenly spaced to around the circumference of the circle 16.

Figure 2:
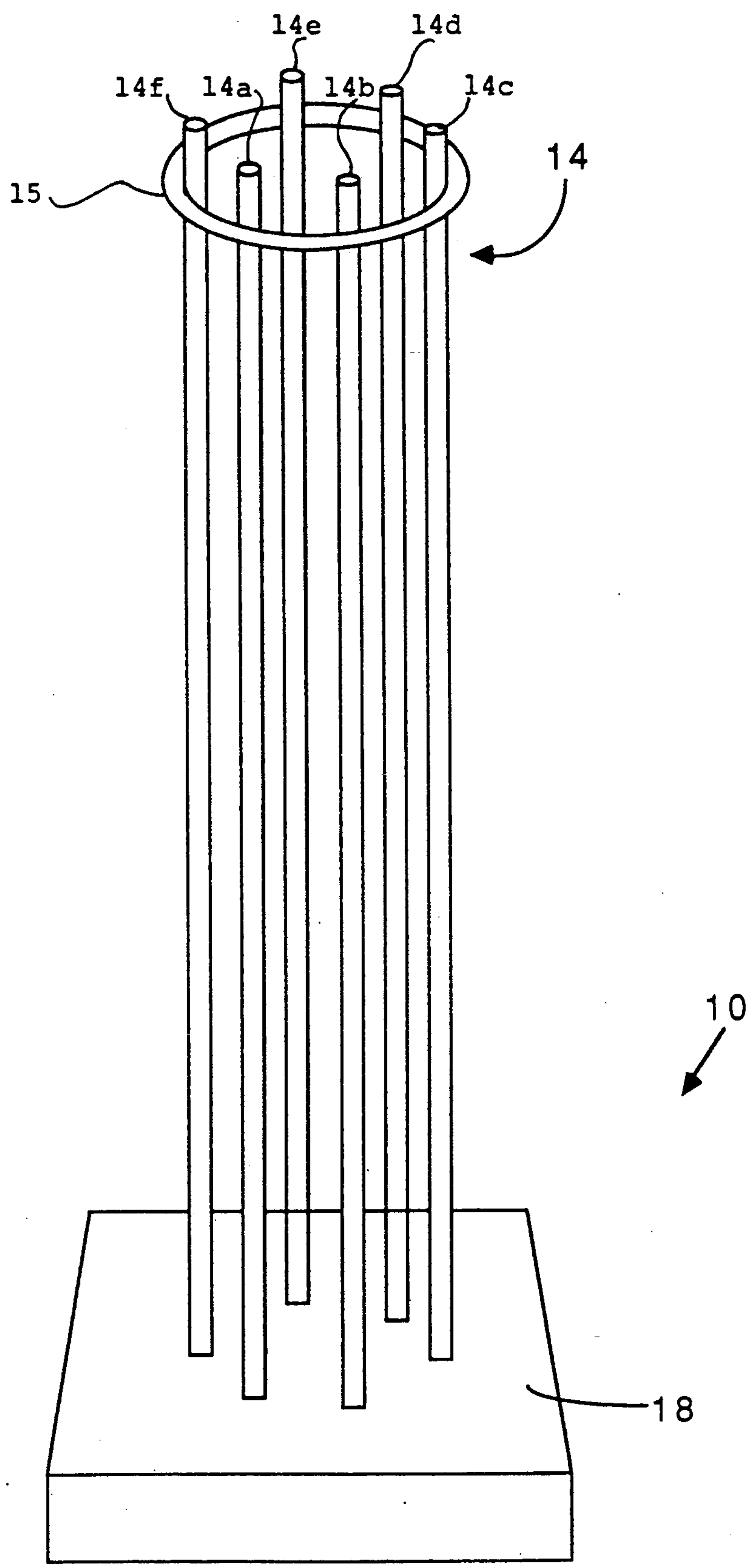
FIG. 2 depicts an amusement device constructed in accord with a preferred practice of the invention having a guide tube with a reinforcing ring.

The rods 14*a*–14*f* of FIG. 1 are preferably constructed from a rigid material, e.g., steel. However, the rods 14*a*–14*f* may also be constructed from a less rigid material, e.g., hard plastic, and the guide 14 configured in the manner shown in FIG. 2. There, the illustrated guide tube 14 includes a ring 15 attached at the top of the rods 14*a*–14*f* to provide reinforcement. Preferably, that ring 15 is affixed to the outside of the rods 14*a*–14*f* to insure that it does not interfere with movement of the top ball 12*a* as it flies out of the tube.

Referring to FIG. 1, to insure that the balls remain substantially aligned, the diameter the cross-section 16 is substantially equal to that of the balls 12*a*, 12*b*. Preferably, the diameter of cross-section 16 is slightly larger than that of the elements 12*a*, 12*b* so that those elements 12*a*, 12*b* do not make significant frictional contact with the guide 14. Additionally, the guide 14 is preferably constructed so as to allow air to be pushed out of the way as the balls 12*a*, 12*b* as they travel.

In the illustrated embodiment, the ball 12*a* positioned furthest along the line defined by the guide tube 14 in the direction opposite the pull of the gravitational force field, i.e., in the +z direction, is termed the "top" ball. Likewise, the ball 12*b* positioned furthest along the line defined by the guide tube 14 in the direction of the gravitational force field, i.e., in the −z direction, is termed the "bottom" ball.

The balls 12*a*, 12*b* are characterized as having substantially identical acceleration under application of the force field and being of different masses, preferably defining a wide range, with the heavier of the balls on the bottom. The balls 12*a*, 12*b* preferably also have a high coefficient of restitution. The use of a sealed balls having differing wall thicknesses, with interiors which are either pressurized or at atmospheric pressure provide both of these characteristics.

For the heaviest ball 12*b*, the wall thickness can be increased to form a solid ball. This dictates the use of synthetic rubbers with high coefficients of restitution. In addition, the mass of the heaviest ball 12*b* can be increased by molding a thick layer of the synthetic plastic around a core of a denser material (e.g., lead).

With the top ball 12*a* and bottom ball 12*b* defining the lightest and heaviest of the bounce elements, the weight of the intervening balls (not shown) preferably follow a geometric progression to achieve a maximum rebound height for the top ball 12*a*, as described below. It will be appreciated that as more balls are added, additional height is not necessarily gained because of the energy losses of the additional collisions. Moreover, for a given height of guide tube 14, adding more balls reduces the height from which the lowest one 12*b* can be dropped while still insuring the heights one 12*a* stays inside the guide tube 14 prior to the drop.

According to a preferred embodiment providing the highest rebound, three balls are used. The lowest ball 12*b* is preferably constructed from solid rubber; the intermediate ball (not shown) is constructed from celluloid; and the top ball 12*a* is constructed from thin-walled celluloid.

The illustrated device 10 further includes a base 18 positioned adjacent the guide 14 at the end lying furthest along the z-axis, e.g., at the bottom of the guide tube 14. The base 18 deflects the bottom ball when it strikes in the downward direction −z and, thereby, causes it to rebound in the upward direction +z. Preferably this base 18 is constructed from a non-dissipative material, e.g., ½"-thick rigid acrylic.

Figure 3:
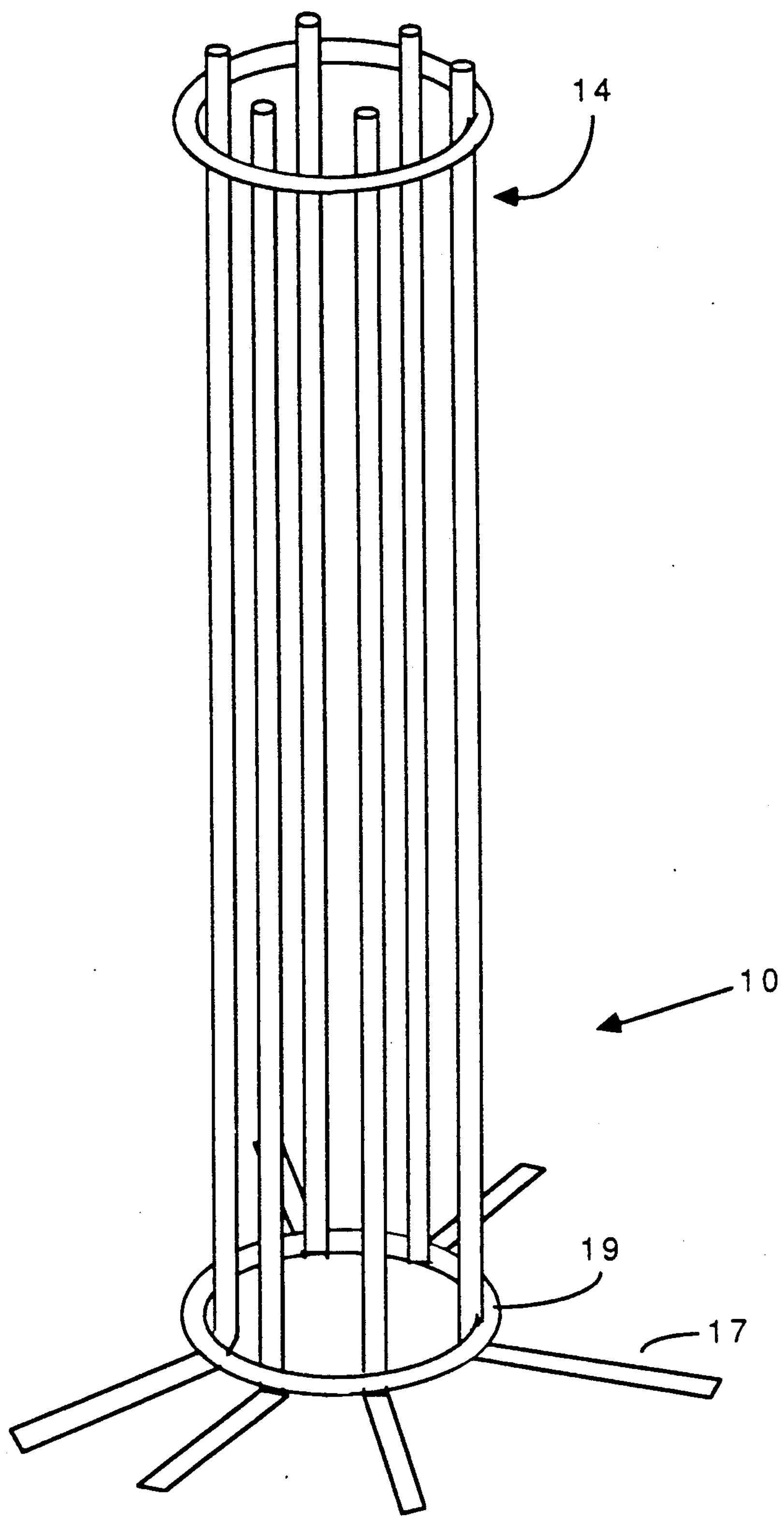
FIG. 3 depicts an amusement device constructed in accord with a preferred practice of the invention utilizing a self-supporting guide tube.

The rods 14a–14f of device 10 of FIG. 1 are preferably permanently affixed to base 18. In the alternate embodiment of FIG. 3, the guide 14 is configured with a flanged end 17 and reinforced by ring 19 so that it is self supporting. In an amusement device constructed in accord with this embodiment, the balls 12a, 12b rebound from a surface upon which the guide 14 is placed by the operator.

Turning again to FIG. 1, spaces between the rods 14a–14e of the guide tube 14 define activation elements, one of which is marked as element 20, that permit balls 12a, 12b to be translated, e.g., lifted by the operator's finger (not shown), to a starting position 22 spaced apart from the base 18 in the +z direction. Preferably, the illustrated activation element 20, defined by the space between rods 14b and 14c is wide enough to permit the insertion of the operator's finger.

In operation, the operator lifts the balls 12a, 12b together and positions them substantially adjacent one another at the starting position 22. The operator then releases the balls, so that they "free fall" under the gravitational force field in the −z direction. When the bottom ball 12b strikes the base 18, it is deflected in the opposite direction (i.e., the +z) direction, causing it and the top ball 12a to rebound with a greater velocity than it had during free fall. As a result, the ball 12a bounces higher than its original starting position, e.g., out of the guide tube 14, providing much amusement to the operator.

Figure 4:
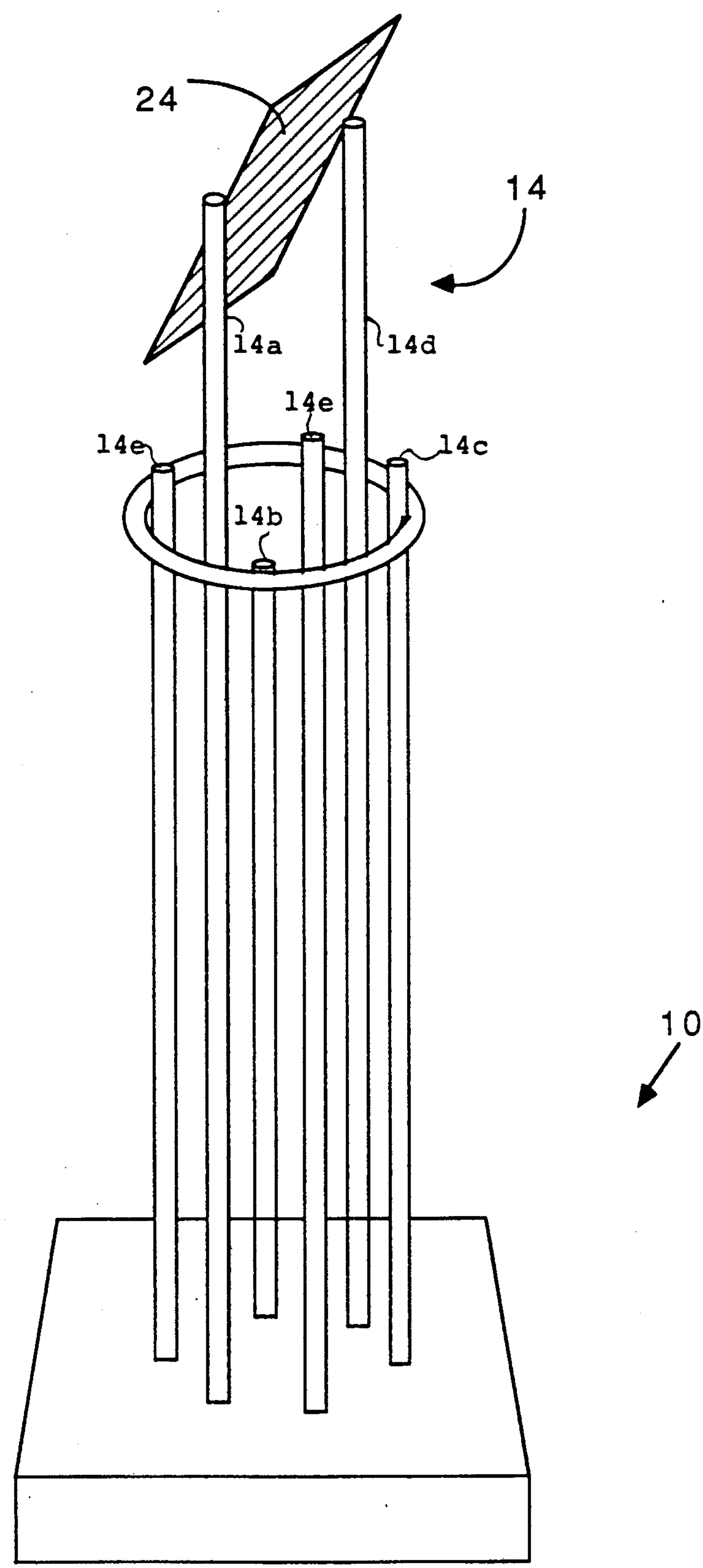
FIGS. 4 and 5 depict amusement devices constructed in accord with preferred practices of the invention suitable for use in games.

An alternative preferred embodiment of the invention suitable for use as part of a game is shown in FIG. 4. The illustrated device 10 includes a deflector plate 24 pivotably mounted at the top of the guide 14. Preferably, for example, the deflector plate 24 is connected to the extended rods by a pivot mechanism. In operation, the deflector plate 24 can be rotated or tipped by the operator to allow the top ball to be aimed at a variety of targets (not shown).

Figure 5:
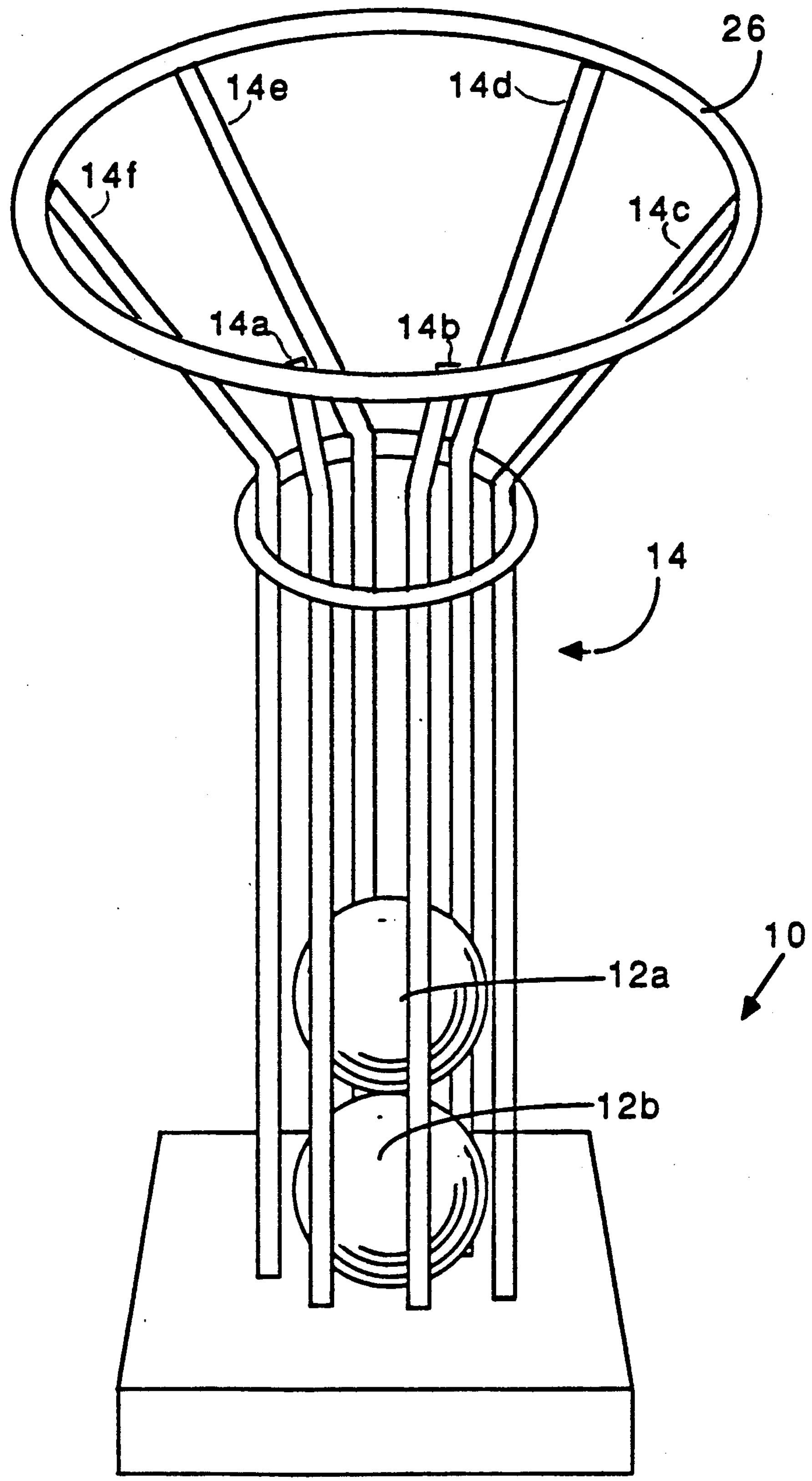

Another alternative preferred embodiment of the invention suitable for use as part of a game is shown in FIG. 5. The illustrated device 10 includes a funnel portion 26 disposed at the top of the guide 14. Preferably, this funnel 26 is formed by extending the rods 14a–14f in a flanged configuration and reinforcing them with ring in the manner illustrated. In operation, the funnel 26 can be used by the operator to catch the top ball 12a after it has left the guide 14.

PRINCIPLES OF OPERATION

The operation of the device 10 is based on the principles of momentum and energy transfer between moving objects, e.g., balls 12a, 12b, of different masses that collide. Consider a collision in which no energy is lost. Let IV1-Initial velocity of first object
FV1-Final velocity of first object
M1-Mass of first object
IV2-Initial velocity of second object
FV2-Final velocity of second object
M2-Mass of second object then $$FV1 = \frac{(IV1 - IV2)(M1 - M2)}{(M1 + M2)} + IV2$$

Now consider the case of two balls 12a, 12b of different masses (the lighter one on top) being dropped from a height H above a rebounding surface. Their velocity just before hitting the surface is −sqrt(2gH), where g is the gravitational acceleration. Let V be sqrt(2gH). Just after the bottom ball 12b rebounds, but before it hits the top ball 12a, it has velocity V and the top ball has velocity −V. Using the formula above the velocity of the top ball is:

$$FV = \frac{-2V(M1 - M2)}{(M1 + M2)} + V$$

If the top ball's mass is (for example) ⅓ that of the bottom ball then:

$$FV = 2V$$

and the height to which it rises is:

$$V^2/2g \text{ or } 4H.$$

Loss of energy at the collision causes the actual height to be less than that. If more than two balls are used then the multiplying effect at each collision causes the height of the topmost ball to be higher than the height for the two ball case.

In view of the teachings herein, it will be appreciated that an amusement device constructed in accord with the invention may be arranged for use in force fields other than gravity, e.g., magnetic or electrostatic fields. A magnetic field may be established, for example, by placing a magnet in the base 18 or, alternatively, by surrounding the guide tube 14 with a current-carrying coil. In such embodiments, the magnetic field need not be aligned vertically and, instead, may be aligned horizontally, or in any other direction.

Described above is an improved amusement device that exploits the laws of physics. The device, which can operate in gravitational or other force fields, serves adult and child alike. Moreover the device is of simple construction and can be fabricated at low cost.

Those skilled in the art will appreciate that the particular embodiments discussed herein are exemplary only, and that other devices falling within the scope of the invention may be constructed via the addition, modification and deletion of at least certain components referred to above. For example, it will be appreciated that a latch could be affixed to the guide tube at the starting position in order to hold the balls prior to release.

In view of the foregoing, what I claim is:

1. An amusement apparatus for use in a force field applied in a first direction along a first axis, said apparatus comprising a plurality of bounce means for substantially identical acceleration along said first axis under application of said force field, guide means for substantially constraining said plurality of bounce means to movement substantially in a line lying parallel to said first axis, wherein said bounce means positioned furthest along said line in a second direction which is opposite said first direction is termed a "top" bounce means, and wherein said bounce means positioned furthest along said line in said first direction is termed a "bottom" bounce means, base means, positioned adjacent said guide means at a first end thereof, for reversing a direction of motion said of at least said bottom bounce means, activation means coupled to said guide means for enabling translation of said bounce means to a position spaced-apart from said first end in said second direction, wherein upon positioning said bounce means substantially adjacent one another at said spaced-apart position and releasing them for acceleration in said force field in said first direction towards said base means, at least said top bounce means rebounds in said second direction with a velocity of greater magnitude then that of a greatest velocity achieved during said acceleration in said first direction.

2. An amusement apparatus according to claim 1, wherein said force field is a gravitational field applied in a downward direction along a vertical axis.

3. An amusement apparatus according to claim 1, wherein said plural bounce means include means for providing substantially point contact between one another, and said bottom bounce means includes means for providing substantially point contact with said base means.

4. An amusement apparatus according to claim 2, wherein said bounce means are substantially spherically shaped.

5. An amusement apparatus according to claim 1, wherein said bounce means are of differing mass.

6. An amusement apparatus according to claim 5, wherein said top bounce means has a mass less than that of each of said other bounce means.

7. An amusement apparatus according to claim 6, wherein said bottom bounce means has a mass greater than that of each of said other bounce means.

8. An amusement apparatus according to claim 7, wherein said bounce means, if any, between said top bounce means and said bottom bounce means are of respectively increasing mass.

9. An amusement apparatus according to claim 1, wherein said activation means comprises one or more openings between said constraint means, said openings permitting insertion of a lifting means for translating said bounce means to said second position.

10. An amusement apparatus according to claim 1, wherein said guide means comprises a plurality of rods, each having an axis positioned substantially parallel to said first axis, spaced apart from one another along a periphery of said column.

11. An amusement apparatus according to claim 1, wherein said base means comprises a substantially non-dissipative material.

12. An amusement apparatus according to claim 1, further comprising deflector means, positioned adjacent said guide means at a second end thereof, for deflecting at least said top bounce means in a direction away from said first axis.

13. An amusement apparatus according to claim 1, further comprising a funnel positioned adjacent said guide means at a second end thereof.

14. An amusement apparatus comprising a plurality of resilient balls, at least two of which are of different mass, said balls being housed in a guide tube defining a substantially vertical circular column having a diameter not substantially greater than that of a largest diameter of said balls, said guide tube having an end positioned adjacent to a base including a substantially flat portion lying in a substantially horizontal plane beneath at least said vertical column, and wherein upon positioning said balls with the ball of greatest mass bottommost and substantially adjacent one another at said position above said base and releasing them for free fall towards said base, at least the top one of said balls rebounds with a velocity of greater magnitude than a greatest velocity magnitude achieved during free fall.

15. An amusement apparatus according to claim 14, wherein said guide tube has at least one opening therein permitting lifting of said balls to a position above said base.

16. An amusement apparatus of claim 14, wherein said balls are arranged in said guide tube in order of their respective masses, wherein the lightest of said balls is on top.

17. An amusement apparatus of claim 14, wherein said guide tube is permanently affixed to said base.

18. An amusement apparatus of claim 14, wherein said guide tube is free-standing with respect to said base.

19. An amusement apparatus according to claim 14, further comprising a deflector means, positioned adjacent said guide tube at an end opposite said base, for deflecting at least a top one of said balls in a direction away from vertical.

20. An amusement apparatus according to claim 14, further comprising a funnel positioned adjacent said guide tube at an end opposite said base.

* * * * *